(12) United States Patent
Sampath et al.

(10) Patent No.: US 9,031,044 B2
(45) Date of Patent: May 12, 2015

(54) POWER CONTROL FOR WIRELESS LAN STATIONS

(75) Inventors: Hemanth Sampath, San Diego, CA (US); Richard van Nee, De Meern (NL); Santosh Abraham, San Diego, CA (US); Alok Aggarwal, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 12/352,733

(22) Filed: Jan. 13, 2009

(65) Prior Publication Data

US 2010/0046479 A1    Feb. 25, 2010

Related U.S. Application Data

(60) Provisional application No. 61/090,365, filed on Aug. 20, 2008.

(51) Int. Cl.
*H04W 52/24* (2009.01)
*H04W 52/08* (2009.01)
*H04W 52/14* (2009.01)

(52) U.S. Cl.
CPC ............ *H04W 52/241* (2013.01); *H04W 52/08* (2013.01); *H04W 52/146* (2013.01); *Y02B 60/50* (2013.01)

(58) Field of Classification Search
CPC ..... H04W 52/04; H04W 52/10; H04W 52/18; H04W 52/16; H04W 52/40; H04W 52/50; H04W 52/146; H04W 52/241; H04W 52/243; H04W 52/244
USPC ................. 370/310, 318, 329, 337, 280, 468; 455/522, 69, 70, 63, 67.1, 67.3, 561, 455/517, 501, 504, 63.1, 67.11, 67.13, 130, 455/232.1, 352; 375/135, 297; 714/18, 714/748–749
See application file for complete search history.

(56) References Cited

U.S. PATENT DOCUMENTS 6,628,956 B2 *  9/2003  Bark et al. .................... 455/522
7,809,394 B1 * 10/2010  Li et al. ........................ 455/522

(Continued)

FOREIGN PATENT DOCUMENTS

CN        1862986 A   11/2006
CN      101179307 A    5/2008

(Continued)

OTHER PUBLICATIONS

"Digital cellular telecommunications system (Phase 2+); General Packet Radio Service (GPRS); Overall description of the GPRS radio interface ; Stage 2 (GSM 03.64 version 5.2.0); TS 03 64" ETSI Standards, Lis, Sophia Antipolis Cedex, France, vol. SMG2, No. V5.2.0, Jan. 1, 1998, XP014021122 ISSN: 0000-0001 p. 19, paragraph 6.5.4—p. 22, paragraph 6.5.5.2.

(Continued)

*Primary Examiner* — Habte Mered
(74) *Attorney, Agent, or Firm* — Steven R. Thiel

(57) ABSTRACT

Techniques and apparatus for controlling the transmit power of an uplink (UL) signal from a user terminal in a wireless communications system in an effort to achieve some target characteristic, such as a target carrier-to-interference (C/I) ratio, at an access point (AP) are provided. In this manner, such a user terminal may help avoid or compensate for imbalances in received radio frequency (RF) power between UL signals received from multiple user terminals by the AP. For example, the transmit power at each user terminal may be controlled in an effort to achieve a target post-processing C/I ratio of 28 dB per spatial stream in an effort to reduce large power imbalances and optimize throughput per user terminal. The user terminal and the AP may compose part of a multiple-input multiple-output (MIMO) communication system utilizing spatial-division multiple access (SDMA) techniques.

64 Claims, 9 Drawing Sheets

(56) References Cited

U.S. PATENT DOCUMENTS

| | | |
|---|---|---|
| 8,320,301 B2 | 11/2012 | Walton et al. |
| 2003/0157954 A1* | 8/2003 | Medvedev et al. ............ 455/522 |
| 2004/0203981 A1* | 10/2004 | Budka et al. .................. 455/522 |
| 2004/0218567 A1* | 11/2004 | Budka et al. .................. 370/332 |
| 2005/0143119 A1* | 6/2005 | Chandra et al. ............... 455/522 |
| 2005/0147022 A1 | 7/2005 | Hosur et al. |
| 2005/0153690 A1 | 7/2005 | Marinier et al. |
| 2006/0276134 A1 | 12/2006 | Marinier et al. |
| 2007/0183312 A1* | 8/2007 | Kim ............................... 370/210 |
| 2007/0189047 A1* | 8/2007 | Lee et al. ....................... 363/62 |
| 2008/0057934 A1 | 3/2008 | Sung et al. |
| 2008/0299983 A1* | 12/2008 | Kwak et al. ................... 455/446 |
| 2009/0061885 A1 | 3/2009 | Eastlake, III |
| 2009/0258665 A1* | 10/2009 | Bourlas et al. ................ 455/522 |
| 2009/0262675 A1 | 10/2009 | Tsai, Jr. |
| 2010/0331036 A1* | 12/2010 | You et al. ...................... 455/522 |
| 2011/0077044 A1 | 3/2011 | Sampath et al. |
| 2011/0103241 A1* | 5/2011 | Cho et al. ...................... 370/252 |
| 2012/0064936 A1* | 3/2012 | Vrzic et al. .................... 455/522 |

FOREIGN PATENT DOCUMENTS

| | | |
|---|---|---|
| EP | 1385276 A2 | 1/2004 |
| JP | 2003008507 A | 1/2003 |
| JP | 2008061250 A | 3/2008 |
| TW | 200947905 A | 11/2009 |
| WO | WO-02082751 A2 | 10/2002 |
| WO | WO-2004039011 A2 | 5/2004 |
| WO | WO-2004082308 | 9/2004 |
| WO | WO-2005065271 A2 | 7/2005 |

OTHER PUBLICATIONS

International Search Report and Written Opinion—PCT/US2009/053966—ISAEPO—Dec. 11, 2009.
Taiwan Search Report—TW098127918—TIPO—Aug. 22, 2012.
Taiwan Search Report—TW099144469—TIPO—Feb. 5, 2014.

* cited by examiner ions for data transmission and reception. When SDMA is transmitted from an access point, $N_S \leq \min\{N_T, \text{sum}(N_R)\}$, where $\text{sum}(N_R)$ represents the summation of all user terminal receive antennas. When SDMA is transmitted to an access point, $N_S \leq \min\{\text{sum}(N_T), N_R\}$, where $\text{sum}(N_T)$ represents the summation of all user terminal transmit antennas.

POWER CONTROL FOR WIRELESS LAN STATIONS

CROSS-REFERENCE TO RELATED APPLICATION

This application claims benefit of U.S. Provisional Patent Application Ser. No. 61/090,365, filed Aug. 20, 2008, which is herein incorporated by reference in its entirety.

FIELD

Certain embodiments of the present disclosure generally relate to wireless communication using multi-antenna transmission for spatial division multiple access (SDMA) in a multiple-input multiple-output (MIMO) communication system and, more specifically, to controlling the power of uplink (UL) signals from multiple SDMA stations in such a system.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems. SDMA techniques may be adopted in several emerging wireless communications standards such as IEEE 802.11 (IEEE is the acronym for the Institute of Electrical and Electronic Engineers, 3 Park Avenue, 17th floor, New York, N.Y.) and Long Term Evolution (LTE).

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial channels, where, for all practical purposes, $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S \leq \min\{N_T, \text{sum}(N_R)\}$, where $\text{sum}(N_R)$ represents the summation of all user terminal receive antennas. When SDMA is transmitted to an access point, $N_S \leq \min\{\text{sum}(N_T), N_R\}$, where $\text{sum}(N_T)$ represents the summation of all user terminal transmit antennas.

Orthogonal Frequency Division Multiple Access (OFDMA) is another technique for allowing multiple user terminals to communicate with a single base station. In an OFDMA-based system, multiple user terminals may communicate on different OFDM subcarriers (i.e., different frequencies) to a base station.

SUMMARY

Certain embodiments of the present disclosure provide a method for power control of an uplink (UL) signal in a wireless local area network (WLAN). The method generally includes adjusting the power of the UL signal to meet an access point (AP) target carrier-to-interference (C/I) ratio and transmitting the power-adjusted UL signal.

Certain embodiments of the present disclosure provide a computer-program product for power control of a UL signal in a WLAN. The computer-program product typically includes a computer-readable medium having instructions stored thereon, the instructions being executable by one or more processors. The instructions generally include instructions for adjusting the power of the UL signal to meet an AP target C/I ratio and instructions for transmitting the power-adjusted UL signal.

Certain embodiments of the present disclosure provide an apparatus for power control of a UL signal in a WLAN. The apparatus generally includes means for adjusting the power of the UL signal to meet an AP target C/I ratio and means for transmitting the power-adjusted UL signal.

Certain embodiments of the present disclosure provide a mobile device capable of power control of a UL signal in a WLAN. The mobile device generally includes logic for adjusting the power of the UL signal to meet an AP target C/I ratio and a transmitter configured to transmit the power-adjusted UL signal.

Certain embodiments of the present disclosure provide a method for closed loop power control of a UL signal in a WLAN. The method generally includes receiving a value indicative of the power of the UL signal, determining adjustment information based on at least the received power value and a target C/I ratio, and transmitting the adjustment information.

Certain embodiments of the present disclosure provide a computer-program product for closed loop power control of a UL signal in a WLAN. The computer-program product typically includes a computer-readable medium having instructions stored thereon, the instructions being executable by one or more processors. The instructions generally include instructions for receiving a value indicative of the power of the UL signal, instructions for determining adjustment information based on at least the received power value and a target C/I ratio, and instructions for transmitting the adjustment information.

Certain embodiments of the present disclosure provide an apparatus for closed loop power control of a UL signal in a WLAN. The apparatus generally includes means for receiving a value indicative of the power of the UL signal, means for determining adjustment information based on at least the received power value and a target C/I ratio, and means for transmitting the adjustment information.

Certain embodiments of the present disclosure provide an AP capable of closed loop power control of a UL signal in a WLAN. The AP generally includes a receiver configured to receive a value indicative of the power of the UL signal, logic for determining adjustment information based on at least the received power value and a target C/I ratio, and a transmitter configured to transmit the adjustment information.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide techniques and apparatus for controlling the transmit power of an uplink (UL) signal from a user terminal in a wireless communications system in an effort to achieve some target characteristic, such as a target carrier-to-interference (C/I) ratio, at an access point (AP). In this manner, such a user terminal may help avoid or compensate for imbalances in received radio frequency (RF) power between UL signals received from multiple user terminals by the AP. For example, the transmit power at each user terminal may be controlled in an effort to achieve a target post-processing C/I ratio of 28 dB per spatial stream in an effort to reduce large power imbalances and optimize throughput per user terminal. The user terminal and the AP may compose part of a multiple-input multiple-output (MIMO) communication system utilizing spatial-division multiple access (SDMA) techniques.

The word "exemplary" is used herein to mean "serving as an example, instance, or illustration." Any embodiment described herein as "exemplary" is not necessarily to be construed as preferred or advantageous over other embodiments. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
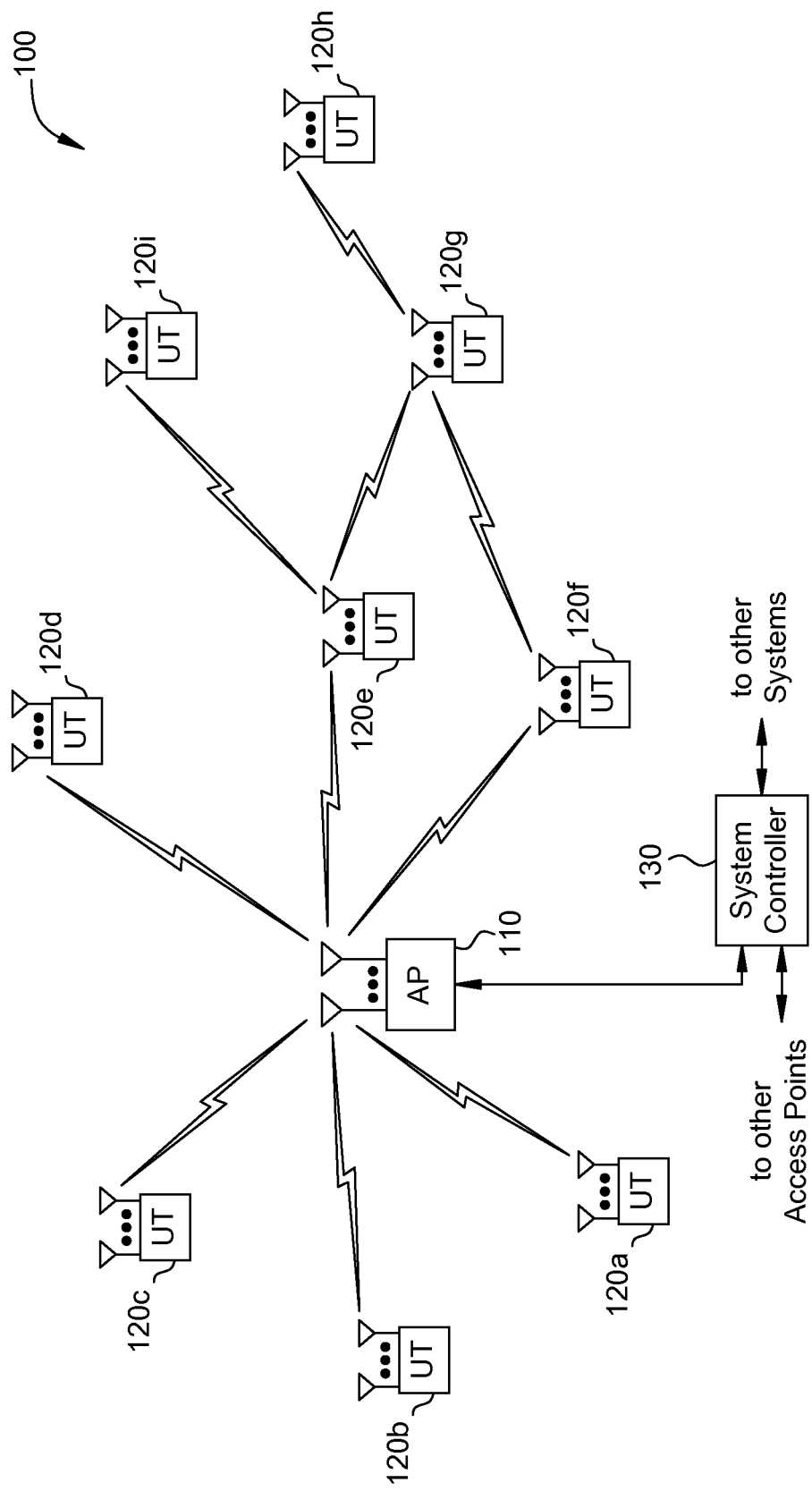
FIG. 1 illustrates a spatial division multiple access (SDMA) multiple-input multiple-output (MIMO) wireless system, in accordance with certain embodiments of the present disclosure.

FIG. 1 shows a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal (UT) may be fixed or mobile and may also be referred to as a mobile station (MS), a station (STA), or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \leq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
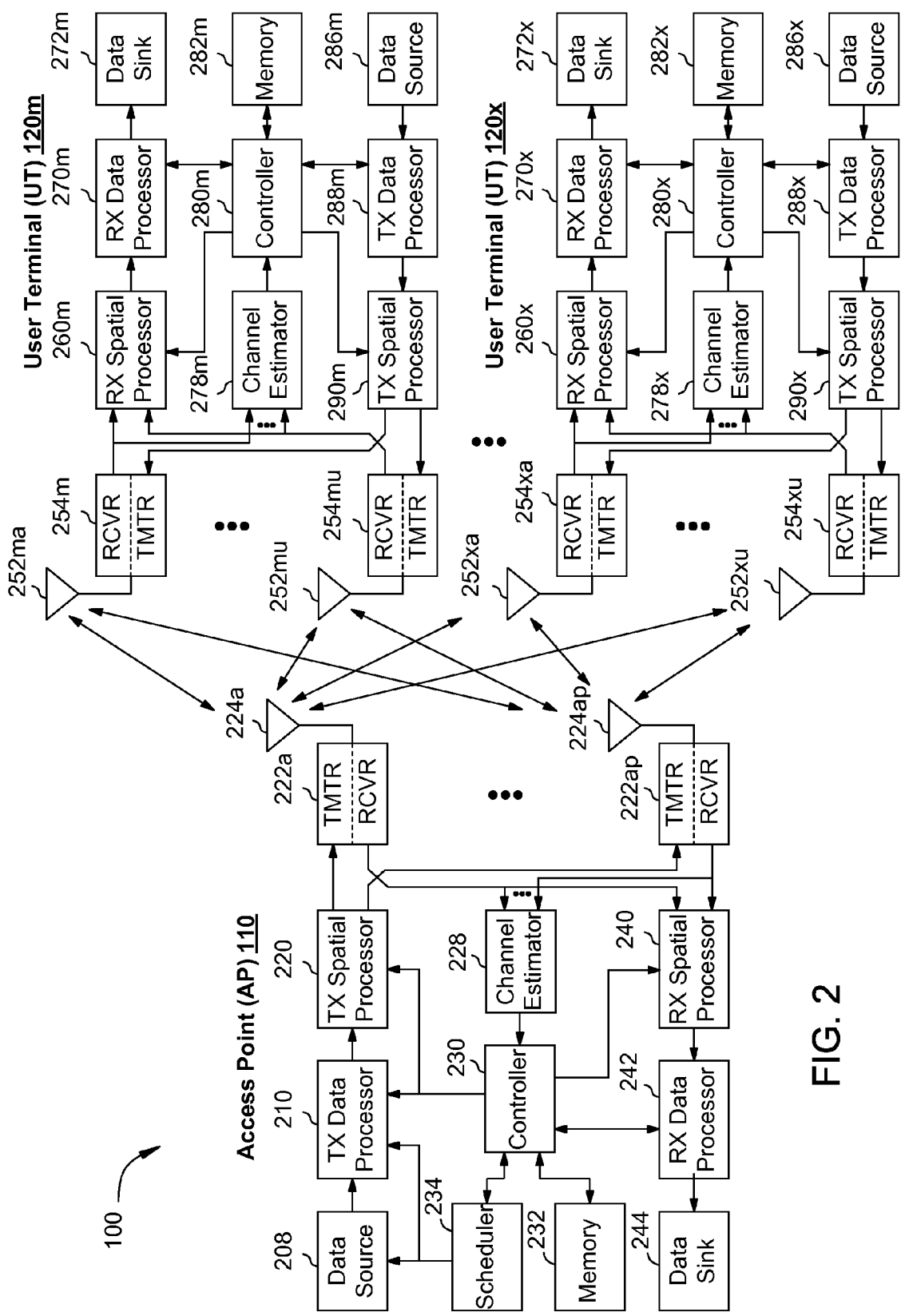
FIG. 2 illustrates a block diagram of an access point (AP) and two user terminals, in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
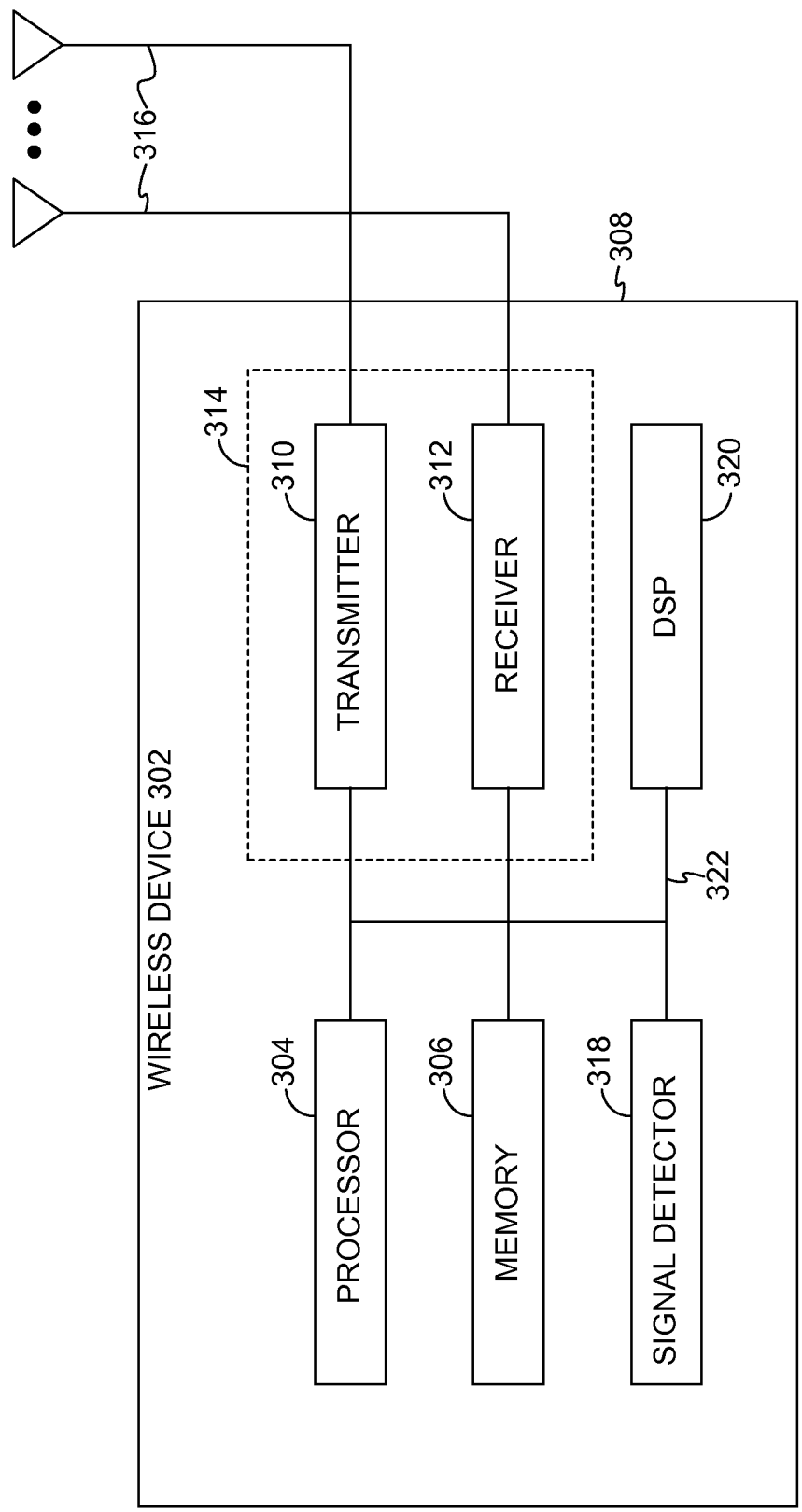
FIG. 3 illustrates various components that may be utilized in a wireless device, in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 206A, which may include both read-only memory (ROM) and random access memory (RAM), provides instructions and data to the processor 304. A portion of the memory 206A may also include non-volatile random access memory (NVRAM). The processor 304 typically performs logical and arithmetic operations based on program instructions stored within the memory 206A. The instructions in the memory 206A may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Power Control for 802.11 Stations for Multiple Access

The next generation of the IEEE 802.11 standard is moving towards SDMA and Orthogonal Frequency-Division Multiple Access (OFDMA). These technologies include provisions for multiple stations (STAs) to be simultaneously transmitting to an access point (AP). However, large power imbalances in the received power from multiple stations may result in performance degradation due to signal-dependent RF noise floors and frequency offset. For example, each AP-STA link may have different frequency offsets, which may lead to inter-channel interference (ICI) distortion. The signal-dependent RF noise floors may arise from I-Q imbalance and RF nonlinearities in each STA.

Figure 4:
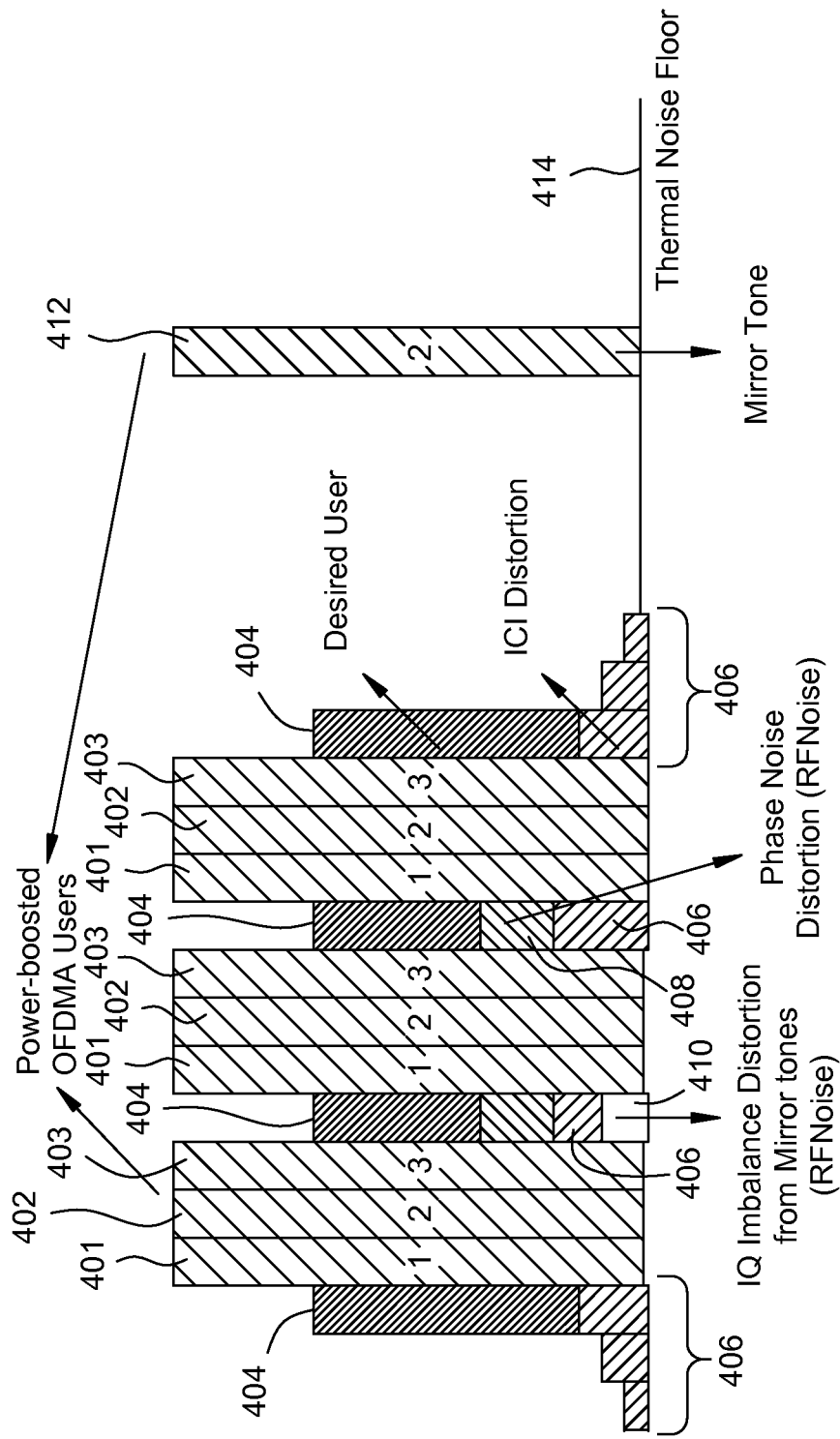
FIG. 4 illustrates performance degradation in an interleaved OFDMA scheme for multiple users, in accordance with certain embodiments of the present disclosure.

For example, FIG. 4 illustrates performance degradation in an interleaved OFDMA scheme with uplink (UL) signals from four users. In FIG. 4, three of the four user UL signal tones are power-boosted OFDMA UL signal tones 401, 402, 403, while the desired user UL signal 404 is not power-boosted in the same manner and, thus, has a lower power level. Such large uplink power differences across user terminals may lead to increased performance degradation for user terminals with lower received OFDMA signal power at the AP. To the first order, even larger performance degradation may be expected from SDMA power imbalances.

As shown, tones adjacent to power-boosted OFDMA (or SDMA) tones 401, 402, 403 may suffer from ICI distortion 406 (due to frequency offset error) and from phase noise distortion 408. Furthermore, tones 412 that are mirrors of OFDMA (or SDMA) power-boosted users may suffer from I-Q imbalance distortion 410 above the thermal noise floor 414.

Accordingly, what is needed are techniques and apparatus for controlling the power of uplink signals from multiple user terminals in an effort to reduce power degradation at an access point, especially for user terminals with lower received signal power at the AP.

Example Open Loop Power Control

Figure 5:
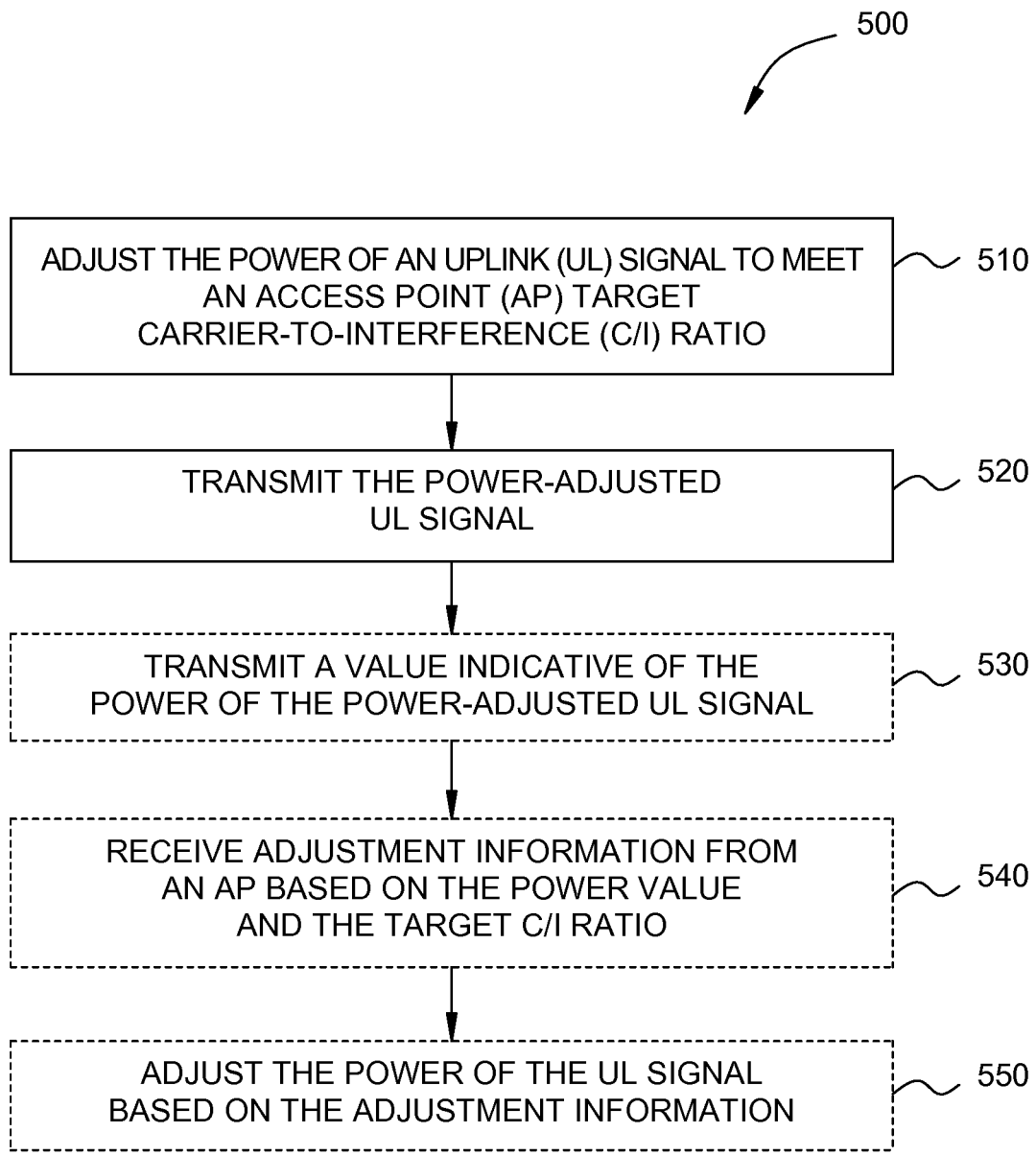
FIG. 5 illustrates example operations for open loop (and optional closed loop) power control of an uplink (UL) signal from the perspective of a user terminal, in accordance with certain embodiments of the present disclosure.

FIG. 5 illustrates example operations 500 for power control of a UL signal from the perspective of a user terminal, according to certain embodiments of the present disclosure. The operations 500 may begin, at 510, by adjusting the power of a UL signal to meet a target carrier-to-interference (C/I) ratio of an access point (AP). This adjustment at 510 may be performed by the user terminal upon reception of DL packets and prior to UL multiple access transmission. The AP's target C/I ratio may be a post-processing target such that the target C/I ratio reflects a desired C/I ratio of a UL signal received from any capable user terminal after reception and signal processing by the AP. For some embodiments, the transmit power of a UL signal may be adjusted to meet the AP target C/I ratio and a client peak power constraint For some embodiments, the target C/I ratio may be 28 dB per spatial stream in an effort to maximize throughput per user terminal. Although a target C/I ratio of 28 dB may yield a heightened spectral efficiency, the target C/I ratio may change depending on the code-rate used. Furthermore, for link-budget limited user terminals, a C/I ratio of 28 dB may not be achievable due to power amplifier (PA) limitations in the transmitter.

To meet the target C/I ratio at the AP, the user terminal's transmit power ($P_{client}$) for the UL signal may be calculated at 510 according to the following formula:

$$P_{client} = SNR_{Target} - G_{OFDMA} - G_{SDMA} - G_{CDMA} + N_{TH} + C + P_{AP} - RSSI_{client}$$

where $SNR_{Target}$ is the target C/I ratio at the AP, $G_{OFDMA}$ is an optional orthogonal frequency-division multiple access (OFDMA) processing gain, $G_{SDMA}$ is an optional spatial-division multiple access (SDMA) processing gain at the AP, $G_{CDMA}$ is an optional code-division multiple access (CDMA) processing gain, $N_{TH}$ is a thermal noise floor, C represents parameters calibrated during association or other representative packet exchange protocols, $P_{AP}$ is an AP transmit power (e.g., advertised by the AP), and $RSSI_{client}$ is a received signal strength indication (RSSI) of a received downlink (DL) signal measured at the user terminal. Some of these parameters may be calibrated out, and other parameters may be provided by the AP, for example.

The calculation for $P_{client}$ may most likely include at least one of $G_{OFDMA}$, $G_{SDMA}$, and $G_{CDMA}$. $G_{OFDMA}$ may be equal to $10 \log_{10}(64/N_{tones})$ where $N_{tones}$ is the number of frequencies used for transmission, and $G_{SDMA}$ may be equal to $10 \log_{10}(M_T/N_S)$ where $M_T$ is the number of transmit antennas and $N_S$ is the number of SDMA spatial streams. The parameters calibrated during association or other representative packet exchange protocols may include, for example, a noise figure at the AP ($NF_{AP}$) and a radio frequency (RF)/antenna gain at the AP ($G_{AP,RF}$). Such parameters may be advertised by the AP.

At 520, the user terminal may transmit the power-adjusted UL signal. The transmitted signal may meet the calculated transmit power $P_{client}$, for example, unless the desired power exceeds the capabilities of the transmitter circuit components, such as the power amplifier. In this manner, the UL signal may be received by an AP and, after post-processing, may achieve the desired target C/I ratio. If multiple user terminals implement the operations at 510 and 520 described above in an effort to transmit multiple UL signals attempting to meet the desired AP target C/I ratio, there need not be large power differences between the UL signals received by the AP, and the performance degradation to UL signals with lower received signal power may most likely be reduced. In other words, according to certain embodiments of the present disclosure, by having the transmit power of UL signals from different user terminals adjusted to meet a target C/I ratio at the AP, significant differences in received UL signal power may be eliminated, and the effects of ICI distortion, phase distortion, and I-Q imbalance, for example, may be mitigated.

Example Closed Loop Power Control

The operations at 510 and 520 may be considered as open loop power control operations because these operations adjust the transmit power of UL signals without feedback from the AP. However, as illustrated by optional operations at 530 to 550, closed loop operations (based on AP feedback) may also be performed. Closed loop power control may be employed in an effort to provide better power control and account for any imperfections in open loop power control due to, for example, an imperfect or outdated RSSI measurement and any changes to AP RF and processing gains. Further, closed loop power control may allow the AP to manage client transmit powers for optimum UL SDMA/OFDMA performance, police rogue clients (i.e., clients that are transmitting with excessive power, perhaps due to incorrect RSSI measurements or estimates), and limit interference generated to neighbor base station subsystems (BSSs), for example, in enterprise applications.

Figure 6A:
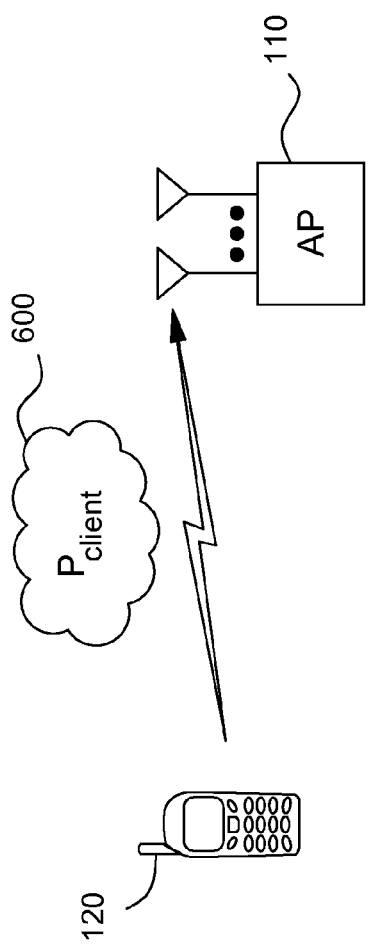
FIGS. 6A and 6B illustrate transmissions of power control information of an access station, in accordance with certain embodiments of the present disclosure.
Figure 6B:
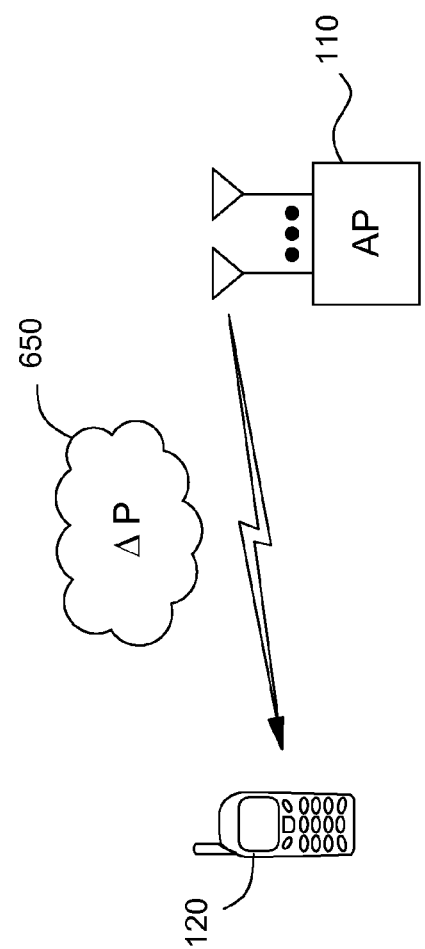

Therefore, for closed loop power control operations as illustrated in FIG. 6A, the user terminal 120 may transmit a value 600 (e.g., $P_{client}$) indicative of the power of the power-adjusted UL signal at 530. At 540, the user terminal 120 may receive adjustment information 650 (represented as ΔP) from the AP 110 as shown in FIG. 6B. For some embodiments, the adjustment information 650 may be based on the power value 600 and the target C/I ratio of the AP 110. For example, the adjustment information 650 may be a new, adjusted target C/I ratio (e.g., $SNR_{Target}'$) or an adjustment to the target C/I ratio (e.g., $\Delta SNR_{Target}$) based on the difference between the target C/I ratio and the actual received C/I after post-processing. At 550, the user terminal 120 may adjust the transmit power of the UL signal based on the adjustment information 650 received from the AP 110.

For certain embodiments, the user terminal 120 may communicate the currently used transmit power value 600, such as $P_{client}$, in units of dBm, for example, to the AP 110 using an N-bit field in a Media Access Control (MAC) header of a UL packet such that bit values ranging from 0 to $2^N-1$ indicate representative values. In such a scenario with N=6 as an example, the bit-representation may cover a range of [0:1:63] corresponding to a power value 600 ranging from [−8.5:0.5:23.0] dBm, for example, with a resolution of 0.5 dBm, for some embodiments.

For other embodiments, the power value 600 communicated by the user terminal 120 may represent a back-off value from a peak transmit power. This feedback may allow the AP 110 to determine the amount of PA headroom available to the user terminal 120. Such information may be needed for DL closed-loop power control signaling for multiple stations.

Hence, a range of [0:1:63] with N=6, for example, may correspond to a peak transmit power that is [0.0:0.5:31.5] dB below the peak transmit power with a resolution of 0.5 dB. The user terminal 120 may communicate the peak transmit power to the AP 110 during association, the initial handshake when the user terminal 120 first enters the network.

Figure 7:
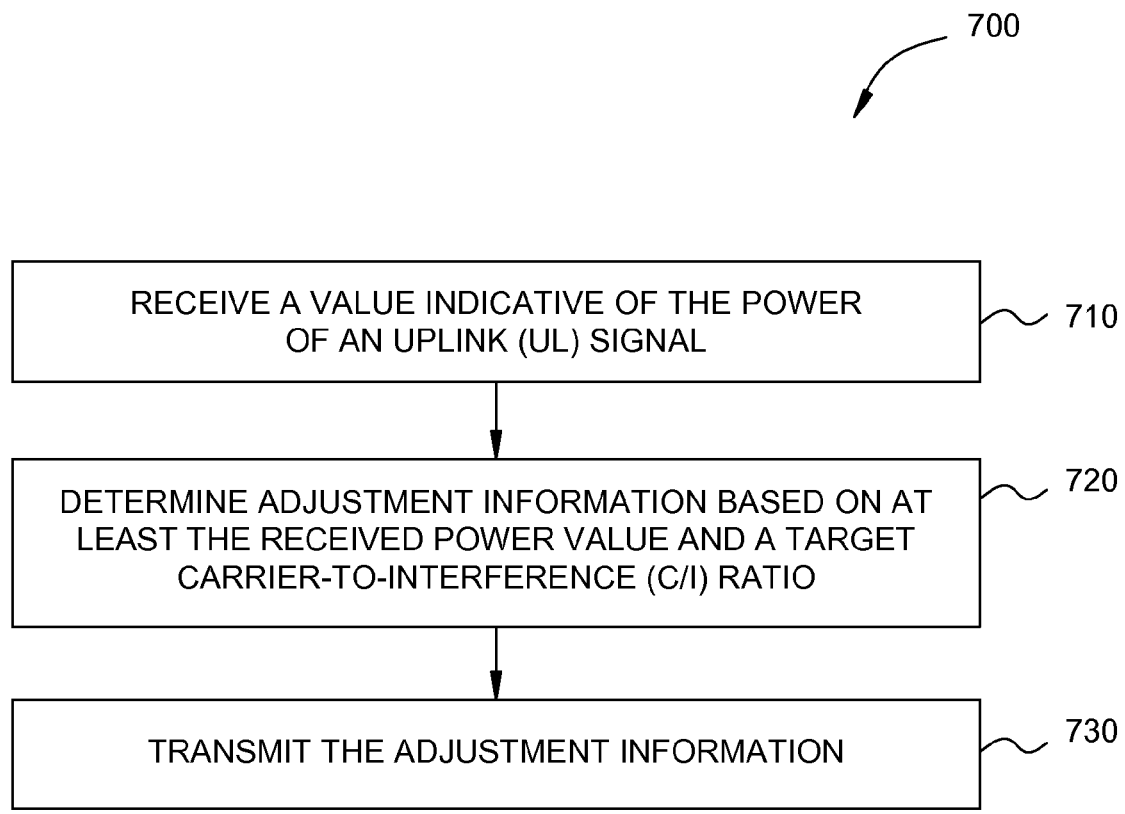
FIG. 7 illustrates example operations for closed loop power control of a UL signal from the perspective of an AP, in accordance with certain embodiments of the present disclosure.

FIG. 7 illustrates example operations 700 for closed loop power control of a UL signal from the perspective of an AP 110. The operations 700 may begin, at 710, by receiving a value 600 (e.g., $P_{client}$ as shown in FIG. 6A) indicative of the power of a UL signal transmitted by a user terminal 120. The AP 110 may be able to decode the power value in a MAC header of a received UL packet.

At 720, the AP 110 may determine adjustment information 650 based on at least the received power value 600 and a target C/I ratio. For example, the adjustment information 650 may be a new, adjusted target C/I ratio (e.g., $SNR_{Target}'$) or an adjustment to the target C/I ratio (e.g., $\Delta SNR_{Target}$) based on the difference between the target C/I ratio and the measured C/I of the UL signal after reception at 710 and post-processing. For some embodiments, the AP target C/I ratio may be 28 dB per spatial stream as described above.

At 730, the AP 110 may transmit the adjustment information 650 (e.g., ΔP as shown in FIG. 6B) to the user terminal 120. To communicate the adjustment information 650, the AP 110 may encode the adjustment information 650 in a MAC header of a DL packet. For certain embodiments, the AP 110 may use an M-bit field in the MAC header of the DL packet such that bit values ranging from 0 to $2^M-1$ indicate representative values. In such a scenario with M=6 as an example, thereby covering a range of [0:1:63], the bit-representation may correspond to an adjustment range of [−16.0:0.5:15.5] dBm for some embodiments.

For other embodiments, the adjustment information 650 communicated to the user terminal 120 may represent a back-off value from a peak transmit power. As noted above, the adjustment information 650 may take into account the PA headroom available to the user terminal 120. Hence, a range of [0:1:63] with M=6, for example, may correspond to a transmit power that is [0.0:0.5:31.5] dB below the peak transmit power with a resolution of 0.5 dB.

The operations 700 may be performed for multiple user terminals, each of which may provide a value indicative of transmit power used for UL transmissions. Thus, the AP may send different power adjustment information to different user terminals.

Figure 5A:
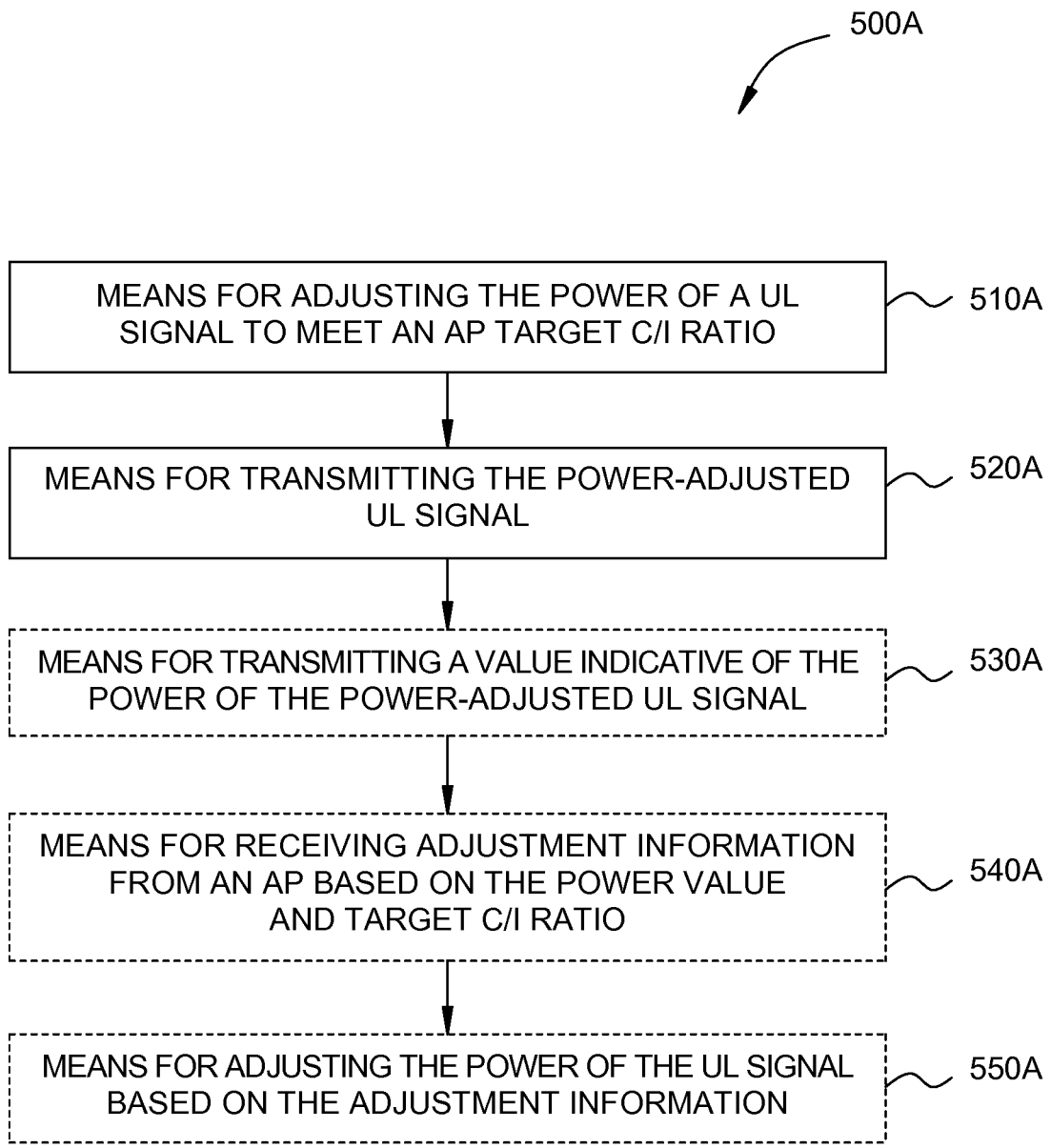
FIG. 5A is a block diagram of means corresponding to the example operations of FIG. 5 for UL signal power control, in accordance with certain embodiments of the present disclosure.
Figure 7A:
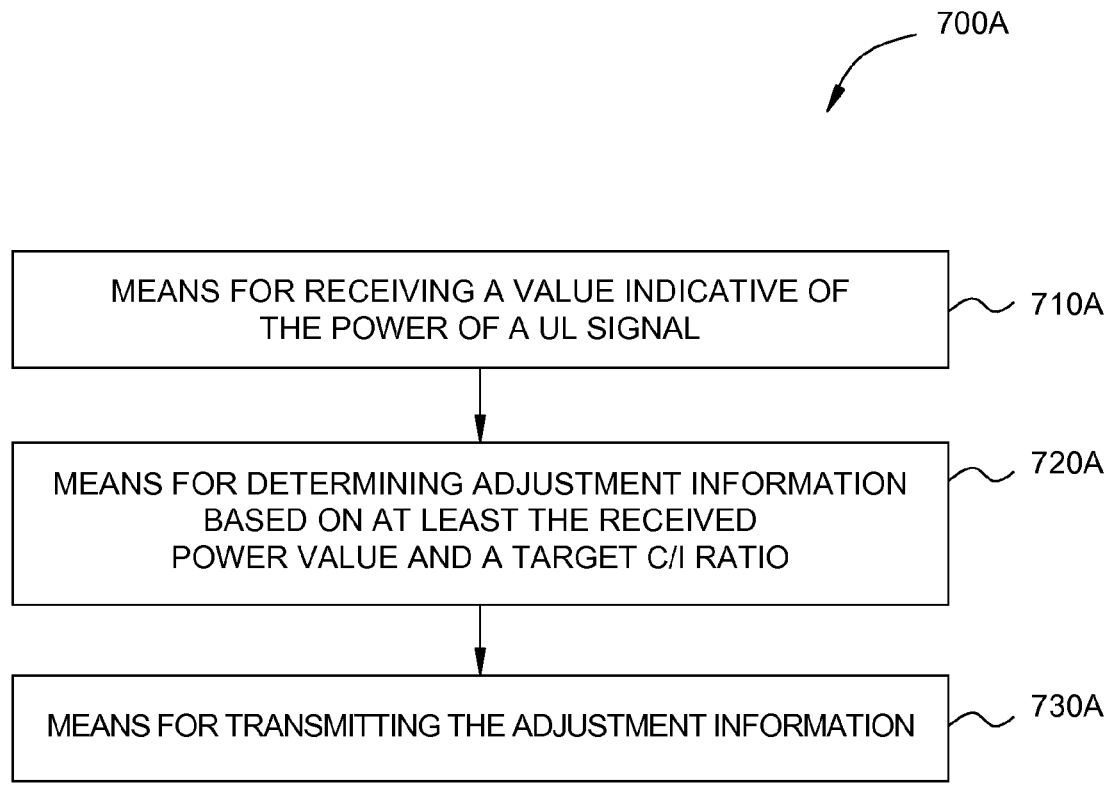
FIG. 7A is a block diagram of means corresponding to the example operations of FIG. 7 for controlling the power of a UL signal from the perspective of an AP, in accordance with certain embodiments of the present disclosure.

The various operations of methods described above may be performed by various hardware and/or software component(s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, blocks 510-550 illustrated in FIG. 5 correspond to means-plus-function blocks 510A-550A illustrated in FIG. 5A. Similarly, blocks 710-730 of FIG. 7 correspond to means-plus-function blocks 710A-730A illustrated in FIG. 7A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for power control of an uplink (UL) signal in a wireless local area network (WLAN), comprising:
adjusting power of the UL signal to meet an access point (AP) target carrier-to-interference (C/I) metric using at least one of $G_{OFDMA}$, $G_{SDMA}$, or $G_{CDMA}$, wherein $G_{OFDMA}$ is an orthogonal frequency-division multiple access (OFDMA) processing gain, $G_{SDMA}$ is a spatial-division multiple access (SDMA) processing gain, and $G_{CDMA}$ is a code-division multiple access (CDMA) processing gain;
transmitting the power-adjusted UL signal to the AP; and
transmitting a value indicative of the power of the power-adjusted UL signal to the AP, wherein the value indicative of the power of the power-adjusted UL signal comprises $P_{client}$, wherein $P_{client}$ includes at least one of the $G_{OFDMA}$ or an $RSSI_{client}$, wherein $RSSI_{client}$ is a received signal strength indication (RSSI) of a received downlink (DL) signal, and wherein transmitting the value indicative of the power comprises encoding the value indicative of the power of the power-adjusted UL signal in a Media Access Control (MAC) header of a UL packet.

2. The method of claim 1, wherein adjusting the power of the UL signal comprises adjusting the power of the UL signal to meet the AP target C/I metric and a client peak power constraint.

3. The method of claim 1, wherein encoding the value indicative of the power of the power-adjusted UL signal comprises encoding the encoding the value indicative of the power of the power-adjusted UL signal in an N-bit field of the MAC header, wherein bit values ranging from 0 to $2^N-1$ indicate representative values.

4. The method of claim 3, wherein the value indicative of the power of the power-adjusted UL signal comprises a backoff value from a peak transmit power.

5. The method of claim 4, wherein N=6 and the representative values range from about 0.0 to 31.5 dB below the peak transmit power with a resolution of 0.5 dB.

6. The method of claim 1, further comprising:
receiving adjustment information from the access point (AP) based on the value indicative of the power of the power-adjusted UL signal and the target C/I metric; and adjusting the power of the UL signal based on the adjustment information.

7. The method of claim 6, wherein receiving the adjustment information comprises decoding the adjustment information in a Media Access Control (MAC) header of a downlink (DL) packet.

8. The method of claim 7, wherein decoding the adjustment information comprises decoding the adjustment information from an M-bit field of the MAC header, wherein bit values ranging from 0 to $2^M-1$ indicate representative values.

9. The method of claim 8, wherein the adjustment information comprises a back-off value from a peak transmit power.

10. The method of claim 9, wherein M=6 and the representative values range from about 0.0 to 31.5 dB below the peak transmit power with a resolution of 0.5 dB.

11. The method of claim 1, further comprising calculating the value indicative of the power-adjusted UL signal as $$P_{client}=SNR_{Target}-G_{OFDMA}-G_{SDMA}-G_{CDMA}+N_{TH}+C+P_{AP}-RSSI_{client},$$

wherein $P_{client}$ is the power of the power-adjusted UL signal, $SNR_{Target}$ is the target C/I metric, $N_{TH}$ is a thermal noise floor, C represents parameters calibrated during association or other representative packet exchange protocols, and $P_{AP}$ is an AP transmit power.

12. The method of claim 11, wherein the parameters calibrated during association or other representative packet exchange protocols comprise an AP noise figure ($NF_{AP}$) and an AP radio frequency (RF)/antenna gain ($G_{AP,RF}$).

13. The method of claim 1, wherein a target C/I is about 28 dB.

14. A computer-program product for power control of an uplink (UL) signal in a wireless local area network (WLAN), comprising a non-transitory computer-readable medium having instructions stored thereon, the instructions being executable by one or more processors and the instructions comprising:
  instructions for adjusting power of the UL signal to meet an access point (AP) target carrier-to-interference (C/I) metric using at least one of $G_{OFDMA}$, $G_{SDMA}$, or $G_{CDMA}$, wherein $G_{OFDMA}$ is an orthogonal frequency-division multiple access (OFDMA) processing gain, $G_{SDMA}$ is a spatial-division multiple access (SDMA) processing gain, and $G_{CDMA}$ is a code-division multiple access (CDMA) processing gain;
  instructions for transmitting the power-adjusted UL signal to the AP; and
  instructions for transmitting a value indicative of the power of the power-adjusted UL signal to the AP, wherein the value indicative of the power of the power-adjusted UL signal comprises $P_{client}$, wherein $P_{client}$ includes at least one of the $G_{OFDMA}$ or an $RSSI_{client}$, wherein $RSSI_{client}$ is a received signal strength indication (RSSI) of a received downlink (DL) signal, and wherein the instructions for transmitting the value indicative of the power comprises instructions for encoding the value indicative of the power of the power-adjusted UL signal in a Media Access Control (MAC) header of a UL packet.

15. The computer-program product of claim 14, wherein the instructions for adjusting the power of the UL signal comprise instructions for adjusting the power of the UL signal to meet the AP target C/I metric and a client peak power constraint.

16. The computer-program product of claim 14, wherein the instructions for encoding the value indicative of the power of the power-adjusted UL signal comprise instructions for encoding the value indicative of the power of the power-adjusted UL signal in an N-bit field of the MAC header, wherein bit values ranging from 0 to $2^N-1$ indicate representative values.

17. The computer-program product of claim 14, further comprising:
  instructions for receiving adjustment information from the access point (AP) based on the value indicative of the power of the power-adjusted UL signal and the target C/I metric; and
  instructions for adjusting the power of the UL signal based on the adjustment information.

18. The computer-program product of claim 17, wherein the instructions for receiving the adjustment information comprise instructions for decoding the adjustment information in a Media Access Control (MAC) header of a downlink (DL) packet.

19. The computer-program product of claim 18, wherein the instructions for decoding the adjustment information comprise instructions for decoding the adjustment information from an M-bit field of the MAC header, wherein bit values ranging from 0 to $2^M-1$ indicate representative values.

20. The computer-program product of claim 14, further comprising instructions for calculating the power-adjusted UL signal as $$P_{client}=SNR_{Target}-G_{OFDMA}-G_{SDMA}-G_{CDMA}+N_{TH}+C+P_{AP}-RSSI_{client},$$

wherein $P_{client}$ is the power of the power-adjusted UL signal, $SNR_{Target}$ is the target C/I metric, $N_{TH}$ is a thermal noise floor, C represents parameters calibrated during association or other representative packet exchange protocols, and $P_{AP}$ is an AP transmit power.

21. The computer-program product of claim 20, wherein the parameters calibrated during association or other representative packet exchange protocols comprise an AP noise figure ($NF_{AP}$) and an AP radio frequency (RF)/antenna gain ($G_{AP,RF}$).

22. The computer-program product of claim 14, wherein a target C/I ratio is about 28 dB.

23. An apparatus for power control of an uplink (UL) signal in a wireless local area network (WLAN), comprising:
  means for adjusting power of the UL signal to meet an access point (AP) target carrier-to-interference (C/I) metric using at least one of $G_{OFDMA}$, $G_{SDMA}$, or $G_{CDMA}$, wherein $G_{OFDMA}$ is an orthogonal frequency-division multiple access (OFDMA) processing gain, $G_{SDMA}$ is a spatial-division multiple access (SDMA) processing gain, and $G_{CDMA}$ is a code-division multiple access (CDMA) processing gain;
  means for transmitting the power-adjusted UL signal to the AP; and
  means for transmitting a value indicative of the power of the power-adjusted UL signal to the AP, wherein the value indicative of the power of the power-adjusted UL signal comprises $P_{client}$, wherein $P_{client}$ includes at least one of the $G_{OFDMA}$ or an $RSSI_{client}$, wherein $RSSI_{client}$ is a received signal strength indication (RSSI) of a received downlink (DL) signal, and wherein the means for transmitting the value indicative of the power comprises means for encoding the value indicative of the power of the power-adjusted UL signal in a Media Access Control (MAC) header of a UL packet.

24. The apparatus of claim 23, wherein the means for adjusting the power of the UL signal comprise means for adjusting the power of the UL signal to meet the AP target C/I metric and a client peak power constraint.

25. The apparatus of claim 23, wherein the means for encoding the value indicative of the power of the power-adjusted UL signal comprise means for encoding the value indicative of the power of the power-adjusted UL signal in an N-bit field of the MAC header, wherein bit values ranging from 0 to $2^N-1$ indicate representative values.

26. The apparatus of claim 23, further comprising:
means for receiving adjustment information from the access point (AP) based on the value indicative of the power of the power-adjusted UL signal and the target C/I metric; and
means for adjusting the power of the UL signal based on the adjustment information.

27. The apparatus of claim 26, wherein the means for receiving the adjustment information comprise means for decoding the adjustment information in a Media Access Control (MAC) header of a downlink (DL) packet.

28. The apparatus of claim 27, wherein the means for decoding the adjustment information comprise means for decoding the adjustment information from an M-bit field of the MAC header, wherein bit values ranging from 0 to $2^M-1$ indicate representative values.

29. The apparatus of claim 23, further comprising means for calculating the power-adjusted UL signal as $$P_{client} = SNR_{Target} - G_{OFDMA} - G_{SDMA} - G_{CDMA} + N_{TH} + C + P_{AP} - RSSI_{client},$$

wherein $P_{client}$ is the power of the power-adjusted UL signal, $SNR_{Target}$ is the target C/I metric, $N_{TH}$ is a thermal noise floor, C represents parameters calibrated during association or other representative packet exchange protocols, and $P_{AP}$ is an AP transmit power.

30. The apparatus of claim 29, wherein the parameters calibrated during association or other representative packet exchange protocols comprise an AP noise figure ($NF_{AP}$) and an AP radio frequency (RF)/antenna gain ($G_{AP,RF}$).

31. The apparatus of claim 23, wherein a target C/I ratio is about 28 dB.

32. A mobile device capable of power control of an uplink (UL) signal in a wireless local area network (WLAN), comprising:
logic for adjusting power of the UL signal to meet an access point (AP) target carrier-to-interference (C/I) metric using at least one of $G_{OFDMA}$, $G_{SDMA}$, or $G_{CDMA}$, wherein $G_{OFDMA}$ is an orthogonal frequency-division multiple access (OFDMA) processing gain, $G_{SDMA}$ is a spatial-division multiple access (SDMA) processing gain, and $G_{CDMA}$ is code-division multiple access (CDMA) processing gain; and
a transmitter configured to transmit the power-adjusted UL signal to the AP and configured to transmit a value indicative of the power of the power-adjusted UL signal to the AP, wherein the value indicative of the power of the power-adjusted UL signal comprises $P_{client}$, wherein $P_{client}$ includes at least one of the $G_{OFDMA}$ or an $RSSI_{client}$, wherein $RSSI_{client}$ is a received signal strength indication (RSSI) of a received downlink (DL) signal, and wherein the value indicative of the power is encoded in a Media Access Control (MAC) header of a UL packet.

33. The mobile device of claim 32, wherein the logic for adjusting the power of the UL signal is configured to adjust the power of the UL signal to meet the AP target C/I metric and a client peak power constraint.

34. The mobile device of claim 32, wherein the value indicative of the power of the power-adjusted UL signal is encoded in an N-bit field of the MAC header, wherein bit values ranging from 0 to $2^N-1$ indicate representative values.

35. The mobile device of claim 32, further comprising:
a receiver configured to receive adjustment information from the access point (AP) based on the value indicative of the power of the power-adjusted UL signal and the target C/I metric, wherein the logic for adjusting is configured to adjust the power of the UL signal based on the received adjustment information.

36. The mobile device of claim 35, further comprising logic for decoding the adjustment information in a Media Access Control (MAC) header of a downlink (DL) packet.

37. The mobile device of claim 36, wherein the logic for decoding the adjustment information is configured to decode the adjustment information from an M-bit field of the MAC header, wherein bit values ranging from 0 to $2^M-1$ indicate representative values.

38. The mobile device of claim 32, further comprising logic configured to calculate the power-adjusted UL signal as $$P_{client} = SNR_{Target} - G_{OFDMA} - G_{SDMA} - G_{CDMA} + N_{TH} + C + P_{AP} - RSSI_{client},$$

wherein $P_{client}$ is the power of the power-adjusted UL signal, $SNR_{Target}$ is the target C/I metric, $N_{TH}$ is a thermal noise floor, C represents parameters calibrated during association or other representative packet exchange protocols, and $P_{AP}$ is an AP transmit power.

39. The mobile device of claim 38, wherein the parameters calibrated during association or other representative packet exchange protocols comprise an AP noise figure ($NF_{AP}$) and an AP radio frequency (RF)/antenna gain ($G_{AP,RF}$).

40. The mobile device of claim 32, wherein a target C/I ratio is about 28 dB.

41. A method for closed loop power control of an uplink (UL) signal in a wireless local area network (WLAN), comprising:
receiving, at an access point (AP) from a user terminal, a value indicative of a power of a power-adjusted UL signal, wherein the value indicative of the power of the power-adjusted UL signal comprises $P_{client}$, wherein $P_{client}$ includes at least one of a $G_{OFDMA}$ or an $RSSI_{client}$, wherein $G_{OFDMA}$ is an orthogonal frequency-division multiple access (OFDMA) processing gain, wherein $RSSI_{client}$ is a received signal strength indication (RSSI) of a received downlink (DL) signal, and wherein receiving the value indicative of the power of the power-adjusted UL signal comprises decoding the value indicative of the power of the power-adjusted UL signal in a Media Access Control (MAC) header of a UL packet;
determining adjustment information based on at least the received value indicative of the power of the power-adjusted UL signal and a target carrier-to-interference (C/I) metric; and
transmitting the adjustment information.

42. The method of claim 41, wherein decoding the value indicative of the power of the power-adjusted UL signal comprises decoding the value indicative of the power of the power-adjusted UL signal from an N-bit field of the MAC header, wherein bit values ranging from 0 to $2^N-1$ indicate representative values.

43. The method of claim 42, wherein the value indicative of the power of the power-adjusted UL signal comprises a back-off value from a peak transmit power.

44. The method of claim 43, wherein N=6 and the representative values range from about 0.0 to 31.5 dB below the peak transmit power with a resolution of 0.5 dB.

45. The method of claim 41, wherein transmitting the adjustment information comprises encoding the adjustment information in a Media Access Control (MAC) header of a downlink (DL) packet.

46. The method of claim 41, wherein encoding the adjustment information comprises encoding the adjustment information in an M-bit field of the MAC header, wherein bit values ranging from 0 to $2^M-1$ indicate representative values.

47. The method of claim 46, wherein the adjustment information comprises a back-off value from a peak transmit power.

48. The method of claim 47, wherein M=6 and the representative values range from about 0.0 to 31.5 dB below the peak transmit power with a resolution of 0.5 dB.

49. The method of claim 41, wherein a target C/I ratio is about 28 dB.

50. A computer-program product for closed loop power control of an uplink (UL) signal in a wireless local area network (WLAN), comprising a non-transitory computer-readable medium having instructions stored thereon, the instructions being executable by one or more processors and the instructions comprising:
  instructions for receiving, at an access point (AP) from a user terminal, a value indicative of a power of a power-adjusted UL signal, wherein the value indicative of the power of the power-adjusted UL signal comprises $P_{client}$, wherein $P_{client}$ includes at least one of a $G_{OFDMA}$ or an $RSSI_{client}$, wherein $G_{OFDMA}$ is an orthogonal frequency-division multiple access (OFDMA) processing gain, wherein $RSSI_{client}$ is a received signal strength indication (RSSI) of a received downlink (DL) signal, and wherein the instructions for receiving the value indicative of the power of the power-adjusted UL signal comprise instructions for decoding the value indicative of the power of the power-adjusted UL signal in a Media Access Control (MAC) header of a UL packet;
  instructions for determining adjustment information based on at least the received value indicative of the power of the power-adjusted UL signal and a target carrier-to-interference (C/I) metric; and
  instructions for transmitting the adjustment information.

51. The computer-program product of claim 50, wherein the instructions for decoding the value indicative of the power of the power-adjusted UL signal comprise instructions for decoding the value indicative of the power of the power-adjusted UL signal from an N-bit field of the MAC header, wherein bit values ranging from 0 to $2^N-1$ indicate representative values.

52. The computer-program product of claim 50, wherein the instructions for transmitting the adjustment information comprise instructions for encoding the adjustment information in a Media Access Control (MAC) header of a downlink (DL) packet.

53. The computer-program product of claim 52, wherein the instructions for encoding the adjustment information comprise instructions for encoding the adjustment information in an M-bit field of the MAC header, wherein bit values ranging from 0 to $2^M-1$ indicate representative values.

54. The computer-program product of claim 50, wherein a target C/I ratio is about 28 dB.

55. An apparatus for closed loop power control of an uplink (UL) signal in a wireless local area network (WLAN), comprising:
  means for receiving, at an access point (AP) from a user terminal, a value indicative of a power of a power-adjusted UL signal, wherein the value indicative of the power of the power-adjusted UL signal comprises $P_{client}$, wherein $P_{client}$ includes at least one of a $G_{OFDMA}$ or an $RSSI_{client}$, wherein $G_{OFDMA}$ is an orthogonal frequency-division multiple access (OFDMA) processing gain, wherein $RSSI_{client}$ is a received signal strength indication (RSSI) of a received downlink (DL) signal, and wherein the means for receiving the value indicative of the power of the power-adjusted UL signal comprise means for decoding the value indicative of the power of the power-adjusted UL signal in a Media Access Control (MAC) header of a UL packet;
  means for determining adjustment information based on at least the received value indicative of the power of the power-adjusted UL signal and a target carrier-to-interference (C/I) metric; and
  means for transmitting the adjustment information.

56. The apparatus of claim 55, wherein the means for decoding the value indicative of the power of the power-adjusted UL signal comprise means for decoding the value indicative of the power of the power-adjusted UL signal from an N-bit field of the MAC header, wherein bit values ranging from 0 to $2^N-1$ indicate representative values.

57. The apparatus of claim 55, wherein the means for transmitting the adjustment information comprise means for encoding the adjustment information in a Media Access Control (MAC) header of a downlink (DL) packet.

58. The apparatus of claim 57, wherein the means for encoding the adjustment information comprise means for encoding the adjustment information in an M-bit field of the MAC header, wherein bit values ranging from 0 to $2^M-1$ indicate representative values.

59. The apparatus of claim 55, wherein a target C/I ratio is about 28 dB.

60. An access point (AP) capable of closed loop power control of an uplink (UL) signal in a wireless local area network (WLAN), comprising:
  a receiver configured to receive, at the AP from a user terminal, a value indicative of a power of a power-adjusted UL signal, wherein the value indicative of the power of the power-adjusted UL signal comprises $P_{client}$, wherein $P_{client}$ includes at least one of the $G_{OFDMA}$ or an $RSSI_{client}$, wherein $G_{OFDMA}$ is an orthogonal frequency-division multiple access (OFDMA) processing gain, wherein $RSSI_{client}$ is a received signal strength indication (RSSI) of a received downlink (DL) signal, and wherein the receiver is configured to decode the value indicative of the power of the power-adjusted UL signal in a Media Access Control (MAC) header of a UL packet;
  logic for determining adjustment information based on at least the received value indicative of the power of the power-adjusted UL signal and a target carrier-to-interference (C/I) metric; and
  a transmitter configured to transmit the adjustment information.

61. The access point of claim 60, wherein the receiver is configured to decode the value indicative of the power of the power-adjusted UL signal from an N-bit field of the MAC header, wherein bit values ranging from 0 to $2^N-1$ indicate representative values.

62. The access point of claim 60, wherein the transmitter is configured to encode the adjustment information in a Media Access Control (MAC) header of a downlink (DL) packet.

63. The access point of claim 62, wherein the transmitter is configured to encode the adjustment information in an M-bit field of the MAC header, wherein bit values ranging from 0 to $2^M-1$ indicate representative values.

64. The access point of claim 60, wherein a target C/I ratio is about 28 dB.

* * * * *